Patented July 5, 1949

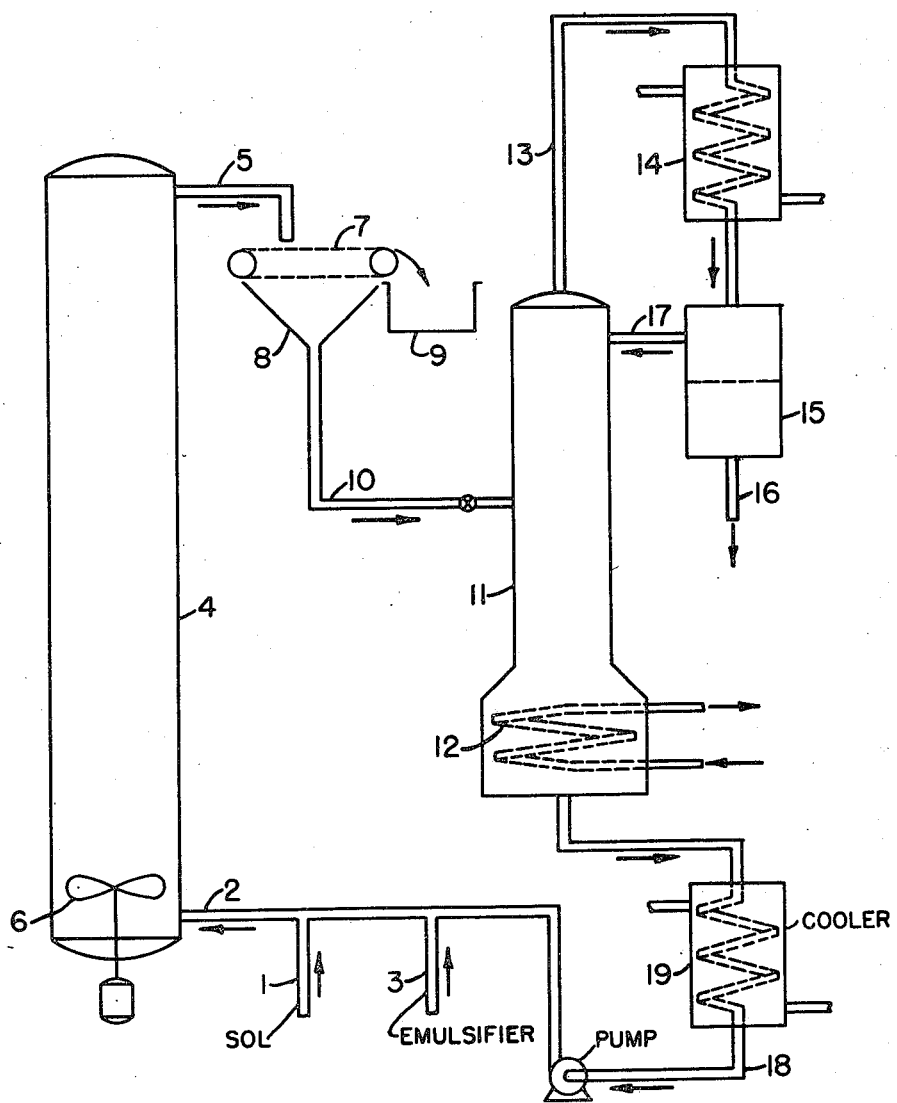

2,474,910

UNITED STATES PATENT OFFICE 2,474,910

PREPARATION OF SPHERICAL GEL PARTICLES

Jerry A. Pierce and Charles N. Kimberlin, Jr., Baton Rouge, La., assignors to Standard Oil Development Company, a corporation of Delaware Application March 4, 1944, Serial No. 525,055

11 Claims. (Cl. 252—448)

This invention relates to the art of preparing adsorbent gels and it relates more particularly to the preparation of gels in spherical form.

Inorganic gels are well known and have long been used for various purposes, for example for the adsorption of condensible vapors from gaseous carriers and for catalytic purposes either as the catalyst itself or as a component thereof or as a carrier. Simple gels may be used alone or after impregnation with catalytic materials or if desired, plural gels such as silica-alumina gels may be used. The present invention deals with the preparation of such gels which can be used for any of the above mentioned purposes either as simple gels or as plural gels. The present method is capable of producing gel particles in uniform spherical shapes which have particularly desirable industrial uses and have many advantages over the irregularly shaped particles ordinarily produced by grinding larger gel aggregates.

The gels produced according to this invention have been found to be particularly useful as catalysts for carrying out reactions involving hydrocarbons and particularly in the so-called fluid catalyst process in which the catalyst is in powdered form and is aerated or fluidized by means of a gas so that it acquires the properties of a liquid such as fluid flow and hydrostatic pressure. It has recently been found that catalysts in spherical form having a particle size particularly suitable for the fluid catalyst process, that is between 20 and 120 microns, can be prepared by causing a sol of the desired gel forming substance to set while dispersed in a water-immiscible liquid such as mineral seal oil, or in suspension between two mutually immiscible liquids, both immiscible in water, one more dense, the other less dense than the sol, such as lubricating oil floating on ethylene dichloride. In the preparation of these spheres it is necessary to carefully control the ratio of sol to the dispersing medium. This is so because of a danger of inverting the emulsion when too little dispersing medium is used with the result that a spongy mass of hydrogel having spherical drops of oil dispersed throughout is formed. Thus, the ratio of sol to dispersing medium must be kept relatively low with the result that a low yield of hydrogel spheres per volume of oil is obtained.

It is therefore an object of this invention to increase the yield of hydrogel spheres per volume of dispersing medium used.

It has now been found that the disadvantages enumerated above can be overcome by dispersing the sol in a partially water-miscible liquid. This allows the ratio between the sol and the dispersing medium to be increased without danger of inverting the emulsion. As a result of increasing this ratio a greater yield of hydrogel particles can be produced per volume of dispersing medium used. While the process of this invention can be used for the preparation of hydrogel spheres from all types of sols it is particularly advantageous for preparing those types of hydrogels which do not require washing before drying and therefore can be prepared and dried in one step. For catalytic purposes certain types of hydrogels such as those prepared from silica sol require washing to remove salts such as sodium sulfate which have been formed during the preparation of the sol. However other types of sols, such as alumina, do not offer this disadvantage since such salts are not formed in the usual methods of preparing these sols. Although the present invention does not offer any particular advantage in preparing hydrogels from those sols which require washing before use nevertheless the process is perfectly applicable to the preparation of such hydrogels if purity is of no importance. Gels which can be prepared directly from hydrogels without the intermediate washing step include oxides of aluminum, iron, titanium, tungsten, nickel, cobalt, etc. and their mixtures such as alumina-boria, alumina-chromia, and alumina-molybdena, etc.

According to one embodiment of the invention a sol of the desired gel forming substance is dispersed in a partially water-miscible liquid which is maintained at a temperature at which the water is removed from the sol to such an extent that gelation occurs. The dispersion is preferably carried out by emulsifying the sol in the dispersing medium so as to form minute particles, the size of which depends upon the degree of dispersion. However it is within the scope of this invention to allow droplets of the sol to set while suspended in a relatively quiescent body of the dispersing medium. In this case much larger particles will be formed.

This invention has particular application to the preparation of alumina gels but is equally applicable to the formation of other types of gels as pointed out above. The setting of an alumina sol is very difficult to control. A concentrated alumina sol may set upon being chilled but cannot be depended upon to do so. A dilute sol may set spontaneously at the end of several months but there is no way of determining the exact length of time which this will take with any degree of certainty. The addition of a base will set either the dilute or the concentrated sol quicker but the time is too short for the sol thus treated to be used in making spheres, except under especially controlled conditions. However, according to the present invention the sol can be set by dispersing the dilute sol in a partially water-miscible liquid at room temperature and allowing the excess water to be withdrawn slowly by the liquid until the point of gelation is reached, at which time the sol will set to a firm hydrogel. The process may then be continued until as much as 50% more or less of the original water content is removed, whereupon the hydrogel becomes hard and sandy. This point is usually reached within an hour. However, if the contact is maintained for several hours longer all but about 3% of the water can be removed.

Suitable partially water-miscible liquids useful as dispersing media according to this invention include normal butyl alcohol, secondary butyl alcohol, methyl ethyl ketone, diethyl ketone, mesityl oxide, butyl aldehyde, propionitrile, acrylonitrile, valeric acid, nitromethane, etc.

The manner in which this process may be carried out will be fully understood from the following description when read with reference to the accompanying drawing which is a diagrammatic view in sectional elevation of one type of suitable apparatus.

Referring to the drawing, alumina sol is introduced through line 1 and emulsified with normal butanol flowing line 2 and containing an emulsifier such as diglycol oleate introduced through line 3. The dispersed sol thus produced is introduced into the bottom of column 4 and passed slowly up the column and withdrawn through line 5. The dispersion of the sol while in column 4 is maintained if desired by means of an agitator 6. However no agitation is needed if the rate of flow of the dispersing medium is greater than the rate of settling of the dispersed phase. While the dispersion of the alumina sol is passed slowly up the column, the butanol withdraws the water from the sol until a concentration is reached at which the dispersed sol particles set to hydrogel spheres. As the spheres continue up the column further quantities of water are gradually withdrawn. The degree of dehydration thus effected can be controlled by the time of residence in the tower, by the solvent power of the dispersed medium, by the ratio of dispersed to dispersing phase and by the particle size of the dispersed phase. It is generally sufficient if the rate of flow and height of the column are so proportioned that the particles have a residence time in the column of between 15 minutes to one hour, at the end of which time firm hard spheres of hydrogel will have been formed; however the residence time may be increased up to 3 hours if a more completely dried material is desired. The diameter of the spheres thus obtained will be below 1 mm., the exact diameter depending upon the amount of emulsifier, degree of dispersion, etc.

The more or less dehydrated hydrogel spheres are removed from column 4 through line 5 on to an endless filter belt 7 whereupon excess butanol passes through the belt and is collected in funnel 8. The hydrogel spheres are discharged from the belt into storage hopper 9. Butanol collected in funnel 8 is carried by line 10 into the middle portion of tower 11. The lower section of this tower is maintained at a temperature of about 240° F. by means of steam coil 12. An azeotropic mixture of butanol and water is withdrawn from the top of tower 11 through line 13, cooled in condenser 14 and collected in separator 15. In this separator, two liquid layers form, an upper layer of butanol and a lower layer of water. The water is discharged through line 16 and the butanol is returned to the column through line 17. Dry butanol is removed from the bottom of tower 11 through line 18, passed through cooling coil 19 and returned to the mixing step in line 2.

The process of the present invention may be widely varied. For example column 4 may be maintained at an elevated temperature so that the miscibility of the butanol with water will be increased. According to this modification the butanol from funnel 8 is cooled and then passed directly to separator 15 where phase separation occurs as a result of the reduced solubility of water in butanol at the lower temperature. Water-free butanol is then recycled through line 17 directly to line 2. If larger spheres are desired, the addition of the emulsifying agent through line 3 is omitted and the droplets of oil are allowed to slowly move up the column 4 in the absence of any agitation. In this case the density of the butanol should be increased above that of the sol by the addition of a heavy substance, such as acetylene tetrabromide.

In order to illustrate the invention further the following examples are given which are not to be considered as limiting the invention in any manner whatsoever.

Example 1

25 cc. of a 3% alumina sol was made by peptizing amalgamated aluminum and was dispersed in butanol. The drops of sol were allowed to remain in the butanol at room temperature for about an hour and a quarter at the end of which time the sol had set to a hydrogel and a large portion of the water had been removed from the hydrogel. The excess butanol was removed from the hydrogel by low temperature evaporation and the dry product was activated at 950° F. The resulting gel showed a surface area measurement of 442 square meters per gram and with an apparent density of 0.4.

Example 2

A silica sol was prepared by pouring into 100 cc. of 25° Bé. sodium silicate an equal volume of 23° Bé. sulfuric acid with stirring. Butanol containing 5 drops of aerosol was kept in agitation while the silica sol was added and dispersed by mechanical agitation. The dispersed sol was allowed to remain in contact with the butanol for 2½ hours after which the hydrogel spheres were removed and washed free of sulfate ion and the material then dried in air at 90° F. The material was later activated at 850° F. for 3 hours. The spherical particles dried without agglomerating.

The spherical particles produced according to this invention have many industrial uses but are particularly suited for the conversion of hydrocarbons by the so-called fluid catalyst process. For example these spheres may be used alone or with the addition of other materials for the cracking, hydrogenation, and dehydrogenation of oils, for the reforming of naphthas in the presence or absence of hydrogen, for the isomerization and alkylation of hydrocarbons, for the hydrogenation of the oxides of carbon etc. They may be used alone or as carriers for other catalyst materials. For example they may be impregnated with oxides or sulfides of metals of the IV, V, VI, and VIII groups of the Periodic system to produce catalysts eminently suited for the reforming of naphtha in the presence of hydrogen, for the cracking and dehydrogenation of oil, etc. Other uses to which these spheres may be put include abrasives, detergents, metal polishes, etc.

The nature and objects of the present invention having thus been fully set forth and illustrative embodiment of the same given what is claimed as new and useful and desired to be secured by Letters Patent is:

1. Process for preparing adsorbent inorganic gels in spherical form which comprises maintaining a sol of the desired gel-forming substance in contact with an organic liquid which is partially miscible with water so that said organic liquid is a continuous phase surrounding the sol, maintaining the sol in contact with said organic liquid until the sol sets to a hydrogel and drying said hydrogel.

2. Process for preparting dry adsorbent inorganic gels in spherical form which comprises emulsifying a sol of the desired gel-forming substance in an organic liquid which is partially miscible with water, maintaining the sol emulsified in said organic liquid until the sol sets to a hydrogel and continuing the contact between the hydrogel particles and the said organic liquid until the greater portion of the water is removed from the hydrogel.

3. Process for preparing dry adsorbent alumina gel in spherical form comprising emulsifying alumina sol in normal butanol, maintaining the alumina sol emulsified in said butanol until the sol sets to a hydrogel and maintaining the hydrogel in contact with the said butanol until the greater portion of the water is removed from the hydrogel.

4. A continuous process for preparing dry adsorbent alumina gel in spherical form which comprises continuously emulsifying alumina sol in normal butanol, continuously passing a stream of said emulsion of alumina sol in butanol upwardly through a setting zone at such a rate that the sol sets to a hydrogel in the form of spheres during passage through said zone, continuously withdrawing hydrogel spheres and butanol from the top of said setting zone, separating hydrogel spheres from the aqueous butanol, subsequently separating water from the aqueous butanol and returning said butanol to said emulsion step.

5. A continuous process for preparing dry adsorbent alumina gel in spherical form which comprises continuously emulsifying alumina sols in normal butanol, continuously passing a stream of said emulsion of alumina sol in butanol upwardly through a setting zone at a temperature at which the miscibility of the butanol with water is substantially increased and at such a rate that the sol sets to a hydrogel in the form of spheres during passage through said zone, maintaining the hydrogel particles in contact with the butanol until the greater portion of the water is removed from the hydrogel, continuously withdrawing hydrogel spheres and butanol from the top of said setting zone, separating aqueous butanol from the hydrogel spheres, cooling said separated aqueous butanol to cause phase separation between the butanol and water and recycling butanol to said emulsion step.

6. A continuous process for preparing dry adsorbent alumina gel in spherical form which comprises continuously emulsifying alumina sol in normal butanol, continuously passing a stream of said emulsion of alumina sol in butanol upwardly through a setting zone at such a temperature and at such a rate that the sol sets to a hydrogel in the form of spheres and the greater portion of the water is removed from the hydrogel while in the setting zone, continuously withdrawing hydrogel spheres and the butanol from the top of said setting zone, separating butanol from the hydrogel spheres, distilling said butanol to remove the water and recycling water-free butanol to said emulsion step.

7. Process for preparing spherical inorganic gels comprising emulsifying a sol of the desired gel-forming substances in an organic liquid which is partially miscible with water, controlling the temperature of said organic liquid so as to remove sufficient water from said sol to cause said sol to set to a hydrogel.

8. Process for preparing spherical inorganic gels comprising emulsifying a sol of the desired gel-forming substance in normal butanol and controlling the temperature of said butanol so as to remove sufficient water from said sol to cause said sol to set to a hydrogel.

9. Improved process for preparing inorganic gels in small spherical particles which comprises preparing a hydrosol of the particular inorganic gel desired, emulsifying the hydrosol as the internal or dispersed phase in an organic liquid which is partially miscible with water, agitating the emulsion to reduce the size of the dispersed particles to the desired particle size, continuing agitation until the hydrosol has set to a gel and then separating the gel particles from the said organic liquid.

10. An improved process for preparing inorganic gels in small spherical particles which comprises preparing a hydrosol of the particular inorganic gel desired, emulsifying the hydrosol as the internal or dispersed phase in an organic liquid which is partially miscible with water, the water miscibility of said organic liquid increasing with temperature, passing the mixture of hydrosol and the organic liquid upwardly through a setting zone at a temperature at which the miscibility of said liquid with water is substantial and at such a rate that the sol sets to a gel, continuously withdrawing gel spheres and said organic liquid from said setting zone, separating said organic liquid from the gel spheres, cooling said organic liquid to cause phase separation between said organic liquid and water and recycling said organic liquid to the emulsion step.

11. The process of preparing inorganic oxide gel catalysts in the form of spherical particles which comprises dispersing an inorganic hydrosol in the form of droplets in an organic liquid which is partially miscible with water, retaining said droplets in said liquid until said hydrosol droplets set to hydrogel particles by extraction of water from said hydrosol by said liquid, removing the resulting particles from the liquid, and drying said particles.

JERRY A. PIERCE.
CHARLES N. KIMBERLIN, Jr.

REFERENCES CITED

The following references are of record in the file of this patent:

UNITED STATES PATENTS

| Number | Name | Date |
|---|---|---|
| 1,297,724 | Patrick | Mar. 18, 1919 |
| 1,614,636 | Wachtel | Jan. 18, 1927 |
| 2,284,248 | Baker | May 26, 1942 |
| 2,385,217 | Marisic | Sept. 18, 1945 |

FOREIGN PATENTS

| Number | Country | Date |
|---|---|---|
| 15,365 | Great Britain | July 6, 1916 |

OTHER REFERENCES

Handbook of Chemistry & Physics—Hodgman & Lange, 1931, page 336.